US 6,704,479 B2

(12) United States Patent
Koplow

(10) Patent No.: US 6,704,479 B2
(45) Date of Patent: Mar. 9, 2004

(54) METHOD FOR COUPLING LIGHT INTO CLADDING-PUMPED FIBER SOURCES USING AN EMBEDDED MIRROR

(75) Inventor: Jeff Koplow, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 19 days.

(21) Appl. No.: 09/910,807

(22) Filed: Jul. 24, 2001

(65) Prior Publication Data

US 2003/0021529 A1 Jan. 30, 2003

(51) Int. Cl.[7] .................................................. G02B 6/26
(52) U.S. Cl. ............................. 385/31; 385/27; 385/36; 372/6
(58) Field of Search ............................. 385/31, 27, 30, 385/50, 36; 372/6

(56) References Cited

U.S. PATENT DOCUMENTS

| 5,037,172 A |   | 8/1991 | Hekman et al. |
| 5,163,113 A |   | 11/1992 | Melman |
| 5,170,458 A |   | 12/1992 | Aoyagi et al. |
| 5,185,758 A |   | 2/1993 | Fan et al. |
| 5,225,942 A | * | 7/1993 | Ikeno et al. ................. 359/836 |
| 5,673,344 A |   | 9/1997 | Li et al. |
| 5,854,865 A |   | 12/1998 | Goldberg |
| 5,864,644 A |   | 1/1999 | DiGiovanni et al. |

OTHER PUBLICATIONS

Goldberg, Pinto, Dennis, Koplow, Fiber Devices, Conference on Lasers and Electro–Optics, May 7–12, 2000, pp. 572–573.

* cited by examiner

Primary Examiner—Hemang Sanghavi
Assistant Examiner—Sung Pak
(74) Attorney, Agent, or Firm—John J. Karasek; L. George Legg

(57) ABSTRACT

An optical fiber includes a core doped with a preselected gain material, an inner cladding disposed about the core, an outer cladding, disposed about the inner cladding, that has a section removed to expose a portion of the inner cladding, a notch disposed in the exposed portion of the inner cladding, and a mirror disposed within the notch that includes a high reflectivity surface oriented so as to reflect light launched into the mirror from an outside source into the fiber. The mirror, e.g. a right-angle trihedron, has a high reflectivity (HR) coating on one face, is inserted into the notch, and affixed thereto with an adhesive such as an optical cement. Pump light, e.g. from a laser diode, is launched through a face of the mirror that is antireflection (AR) coated or sufficiently transparent to the light frequency, and after reflecting off the HR face exits through a third face and into the fiber. The pump light source can typically be positioned in close proximity to the AR face of the mirror since there are no intervening optics or other hardware required in a typical system design.

28 Claims, 13 Drawing Sheets

METHOD FOR COUPLING LIGHT INTO CLADDING-PUMPED FIBER SOURCES USING AN EMBEDDED MIRROR

FIELD OF THE INVENTION

This invention relates to an apparatus and method for optically pumping double-clad fiber lasers and amplifiers using diode lasers, diode bars, or fiber-coupled diode sources. More particularly, the invention relates to an apparatus and method for optical side-pumping an optical fiber that includes an embedded side-mirror.

BACKGROUND OF THE INVENTION

Double-Clad Fiber Optical Sources

Rare-earth-doped fiber lasers and amplifiers are finding widespread use in applications requiring compact, rugged optical sources. In these sources, a rare-earth ion (e.g., $Er^{3+}$ or $Yb^{3+}$) is doped into the fiber core and is optically excited (typically using a diode laser as a pump source); a signal beam propagating in the core experiences gain if a population inversion has been established by absorption of the pump beam by the rare-earth ions (and if the signal beam has a wavelength within the gain spectrum of the rare-earth dopant). The core often supports only the lowest-order transverse mode of the signal beam (a single-mode (SM) fiber), but in some cases can support more than one transverse mode (a multimode (MM) fiber).

In a conventional, single-clad fiber, the signal and pump beams both propagate in the fiber core, which is surrounded by a cladding whose refractive index is lower than that of the core (thereby serving to define the size and numerical aperture, NA, of the core). In double-clad (DC) fiber, a second cladding with a lower refractive index (typically a fluorinated polymer) surrounds the cladding; the first or "inner" cladding can thus guide light launched into it (much as the core guides light). In such a fiber, the signal beam is launched into the core (as in a single-clad fiber); the pump light, however, is launched into the much larger (and usually higher-NA) inner cladding. If the rare-earth dopant is confined to the core of the DC fiber, the pump light will be absorbed in the core, and signal light propagating in the core will experience gain, in a manner similar to that of a single-clad fiber. The advantage of DC fiber, however, is that it permits the use of pump sources that are relatively large (i.e., multimode), high-power, and inexpensive (in comparison with the single-mode pump sources capable of being launched into the core of single-clad fibers). The advent of DC fibers has allowed fiber sources to be scaled to average powers of >100 W.

Prior Art Coupling Schemes

Several techniques for launching pump light into DC fiber exist. These include end pumping, which is the most straightforward approach and which is often used in laboratory applications. The pump light is simply launched into the end of the fiber, typically using one or two lenses and possibly a mirror; optionally, pump light may be launched into both fiber ends. A major drawback of this technique is that one or both of the fiber ends are obstructed by the optics used to launch the pump light. Hence, coupling a signal beam into or out of the fiber requires a means to separate the pump and the signal (typically a dichroic mirror). In addition, this approach lacks scalability (the fiber has only two ends) and is difficult to implement in a compact and rugged manner; the simplicity is generally inferior to other techniques (larger parts count, more optical and mounting hardware). Finally, the fiber ends are easily damaged when high pump powers are used, e.g., if the fiber face is not kept very clean or if the pump beam becomes misaligned. In one implementation of end pumping (U.S. Pat. No. 5,185,758), multiple pump diodes, each with its own collimating lens, are arrayed along a focusing lens to provide more pump power (although not more brightness, because of the angular displacement of the beam from each diode impinging on the fiber face).

In another approach termed tapered, fused fiber bundles, which is described in U.S. Pat. No. 5,864,644, several diode lasers are coupled into individual multimode fibers; these fibers are bundled together, fused and drawn into a taper, and then fusion spliced to a DC fiber. Pump light from the diode lasers is thereby coupled into the inner cladding of the DC fiber. Optionally, the fiber bundle can include a single-mode fiber that is used to couple signal light into or out of the core of the DC fiber. This approach is stable and rugged (because the fibers are fused) and can have high efficiency (if the coupling efficiencies to the pigtails of the individual diode lasers are high). The approach is scalable, although it would be awkward to use with a diode bar. The problem of blocking the fiber end(s) is alleviated by employing the embodiment that incorporates a single-mode fiber into the bundle. Fabrication of a tapered, fused fiber bundle is a complex process, involving stripping the jacket (which exposes the delicate fibers), bundling the fibers in a close-packed formation, fusing (melting) the bundle, drawing the taper, and (usually) recoating with a low-index polymer. The shape and size of the fiber bundle must be customized for the given DC fiber being pumped.

In another approach termed V-groove side-pumping, described in U.S. Pat. No. 5,854,865 which is incorporated herein by reference, a V-shaped notch or groove is cut into the side of the DC fiber, and light from a pump diode (or fiber-coupled pump diode) is launched into the inner cladding by reflection from the facet of the V-groove. The depth of the V-groove is such that it penetrates the inner cladding but does not intersect the core. In the embodiment most commonly used, shown in FIG. 1a, a pump source 1 is placed on the opposite side of a fiber 2 from a V-groove 3, while a micro 4 is used to substantially focus the light onto a V-groove facet 5, and the pump light is coupled into an inner cladding 6 via total internal reflection from the facet. An outer cladding and jacket 7 are stripped from fiber 2 prior to cutting V-groove 3, and fiber 2 is mounted on a glass substrate 8 that transmits the pump light; the adhesive used for mounting fiber 2 to substrate 8 must have a refractive index less than or equal to that of the low-index fluorinated polymer of outer cladding 7 so that the light guiding properties of inner cladding 6 are not compromised. The angular acceptance of V-groove 3 can be increased by coating groove 3 for high reflectivity (HR), although this approach significantly increases the complexity of fabrication and subsequent servicing or repair.

Advantages of V-groove side pumping include high coupling efficiency and compact packaging; it is scalable (by cutting multiple V-grooves) and leaves the fiber ends unobstructed. In practice, however, this technique is alignment sensitive and thus presently lacks adequate long-term stability for many applications. The alignment sensitivity arises in part from the use of the lens (see below), which demagnifies the pump beam and thus increases its angular spread; moreover, available lenses do not allow the brightness of the pump source to be preserved. For a given combination of pump diode and DC fiber, a micro-lens has to be selected or fabricated to be compatible with the size and divergence of the diode and with the size and NA of the fiber inner cladding. For high-power applications, use of a diode bar as a pump source (rather than multiple diodes) would be desirable (see below). The prior art V-groove pumping technique, however, is not compatible with the use of diode bars because each element of the bar would require its own, individually aligned micro-lens, thus introducing prohibitive complexity; in principle, a lens array could be used, but present tolerances on the position and angle of the emitters on a diode bar are insufficient for this approach to be practical.

An alternative embodiment of V-groove side pumping that was recently introduced, in which the micro-lens is omitted, is described in *Proceedings of the Conference on Lasers and Electro-Optics*, OSA Technical Digest Series, paper CFC1 (Optical Society of America, Washington D.C., 2000), by L. Goldberg, J. Pinto, M. Dennis, and J. Koplow. Three possible configurations are shown in FIGS. 1b–1d. The approach shown in FIG. 1b is the easiest to implement (it is very similar to the usual embodiment shown in FIG. 1a, but without the lens), but the relatively large distance between pump diode 1 and V-groove 3 results in significant loss of brightness and potentially reduces the coupling efficiency. The approaches shown in FIGS. 1c and 1d reduce these problems. The configuration shown in FIG. 1c requires that V-groove 3 be HR coated, however, introducing substantial complexity in its fabrication; in addition, a reflection loss on the order of 4% would occur on facet 5 of V-groove 3 through which the pump light enters fiber 2 (the loss could be significantly higher if some of the HR coating were inadvertently deposited on this facet). The configuration shown in FIG. 1d requires that fiber 2 be rotated about the longitudinal axis by 180° and bonded to substrate 8 after cutting V-groove 3, again introducing substantial complexity (the stripped fiber is very delicate, especially after the V-groove is cut). The approach shown in FIG. 1d has been demonstrated experimentally. Although the pump coupling efficiency was approximately 7% less than that obtained with the usual V-groove technique, more importantly, the sensitivity of the coupling efficiency to misalignment was reduced by a factor of 10 in comparison to the approach using a micro-lens, demonstrating the advantage of a "lensless" coupling scheme.

In yet another approach, termed high-reflectivity coated fiber and described in U.S. Pat. No. 5,170,458, the fiber cladding is HR coated (effectively providing a DC fiber with a very high-NA inner cladding). Pump light is launched through a gap or "window" in the coating. This approach has not found widespread use.

Other approaches to coupling light into or out of an optical fiber are disclosed in U.S. Pat. Nos. 5,037,172 and 5,163,113, both of which involve coupling to the core (not the inner cladding). In the former patent, a V-groove that partially intersects the core is coated to increase the reflectivity of one face, thereby allowing a portion of the light propagating in the core to be coupled out of the fiber and/or allowing light to be coupled into the core. In the latter patent, the end of the fiber is cut at an angle to allow a light source on the other side of the fiber to be launched into the core by total internal reflection ("half of a V-groove"). If adapted to pumping DC fibers, this approach would not offer significant advantages over V-groove side pumping; moreover, the technique is not scalable (the fiber has only two ends), and the fiber ends are obstructed by the mounting assembly.

The prior art approaches that involve applying an HR coating to a surface of a notch or groove introduced into a double clad fiber have significant disadvantages. Any coating technique proposed to date has proven to be cumbersome from the standpoint of manufacturing, relatively expensive, and thus impractical. The process conditions, e.g. the temperature at which coating is conducted, are harsh and threaten the structural integrity of the fiber itself, e.g. the outer cladding. Outgassing can occur, undesirably contaminating the coating being applied. Also, in the coating process, the coating undesirably collects on other surfaces such as the vertical face of the groove, reducing its light transmission efficiency. The process is irreversible once such damage occurs, although some of the fiber can usually be salvaged. For these and other reasons, the embodiments incorporating HR-coated grooves have not been carried out in practice or commercially to any extent.

SUMMARY OF THE INVENTION

An optical fiber includes a core doped with a preselected gain material, an inner cladding disposed about the core, an outer cladding, disposed about the inner cladding, that has a section removed to expose a portion of the inner cladding, a notch disposed in the exposed portion of the inner cladding, and a mirror disposed within the notch surface oriented so as to reflect light launched into the mirror from an outside source into the fiber, along the fiber axis. The mirror, e.g. a right-angle trihedron, has an HR coating on one face, is inserted into the notch, and affixed thereto with an adhesive such as an optical cement. Pump light, e.g. from a laser diode, is launched through a face of the mirror that is antireflection (AR) coated or sufficiently transparent to the light frequency, and after reflecting off the HR face exits through a third face and into the fiber. The pump light source can typically be positioned in close proximity to the input face of the mirror since there are no intervening optics or other hardware required in a typical system design.

According to another aspect of the invention, an optical fiber system for transmitting light includes the optical fiber with the embedded side-mirror and the diode.

According to another aspect of the invention, a method for launching light into an optical fiber includes the steps of providing the optical fiber, introducing the notch in the exposed portion of the inner cladding, disposing the mirror within the notch, and launching a light toward the mirror, whereby the mirror reflects the light into the inner cladding and the light is thereby transmitted along the fiber axis.

In a DC fiber source, the pump light must be launched into the inner cladding. As discussed above regarding the background of the invention, several launching methods have been developed. The present invention discloses a new launching method that possesses a number of distinct advantages. Several considerations affect the suitability and desirability of a pumping scheme:

Coupling efficiency—the fraction of the pump light that is coupled into the inner cladding from the pump source (influences both the optical and the electrical efficiency of the system);

Stability—the short- and long-term variations in the coupling efficiency, which influence the sensitivity to mechanical and thermal disturbances and hence system reliability and ruggedness;

Compactness—the size of the required components, mounting hardware, etc.;

Simplicity—the parts count, the required hardware, the alignment procedures, etc., which determine the complexity and the practicality of the coupling scheme (often by influencing the stability, compactness, and ruggedness);

Alignment sensitivity—affects the stability and the ease of implementation of the coupling scheme (alignment sensitivity should be minimized);

Scalability—the ability to scale up the power by using larger, more powerful pump sources or by using multiple pump sources (including diode bars);

Conservation of brightness—the ability of the coupling scheme to launch the pump light without significant loss of brightness (which influences which pump sources and DC fibers can be used);

Obstruction of fiber ends—whether the coupling scheme leaves one or both ends of the DC fiber accessible; access to the fiber ends is critical for launching or coupling out of the signal beam, for mode-stripping (to remove unwanted light propagating in the inner cladding), and for fiber connectorization and splicing.

Compatibility with inner-cladding shapes—a number of inner-cladding shapes are available, including round, square, rectangular, hexagonal, octagonal, and star-shaped; a given coupling scheme may not be applicable to all shapes.

Ease of fabrication—affects the manufacturability of the system; determined by, among other factors, the complexity and alignment sensitivity of the coupling scheme.

Cost.

The above considerations are particularly important for practical applications of DC fiber lasers and amplifiers.

The embedded-mirror side pumping apparatus and method of the invention have several advantages, including:

1) The approach is compact and simple (low parts count).
2) The lack of coupling optics reduces the alignment sensitivity (positional and angular) in comparison with alternative approaches.
3) The compactness, simplicity, and relatively low alignment sensitivity allow rugged and stable packaging of the amplifier.
4) The efficiency of the coupling scheme can provide high net efficiency (electrical-to-optical) for the system.
5) The method is compatible with a variety of pump sources, including fiber-coupled sources, diode bars, and multiple pump sources. In particular, as shown in FIG. 8 (described below), embedded-mirror side pumping enables the use of diode bars without increasing the complexity or the parts count over that required for pumping with a single diode laser. This approach may be used to fabricate a single, high-power amplifier or a multitude of amplifiers sharing a single pump source.
6) It is scalable to high powers. In particular, the capability to directly couple a diode bar to a DC fiber will allow DC fiber lasers and amplifiers to be scaled to very high output powers while maintaining compact and rugged packaging.
7) It leaves the fiber ends completely unobstructed.
8) It is compatible with a variety of inner-cladding shapes.
9) The embedded side-mirror can be fabricated from any glass that will transmit the pump beam (i.e., it does not have to be fused silica); BK-7 is a readily available glass that is appropriate.
10) Fabrication of the mirror is decoupled from fabrication of the notch in the fiber, allowing the two to be optimized independently.
11) Fiber pigtailing of the pump diode(s) or the diode bar is not required.

The prior art with the most similarity to the present invention is V-groove side pumping. In comparison with that technique, embedded-mirror side pumping has the following advantages:

Because the mirror is HR coated, the angular acceptance angle is much larger than that for total internal reflection.

Because the notch cut in the fiber is not used for reflection, the required surface quality is not as high.

The alignment sensitivity is substantially reduced in comparison with the usual implementation of V-groove side pumping using a micro-lens, thus increasing the ease of assembly and the stability.

One embodiment of V-groove side pumping entails HR coating of the V-groove to increase the angular acceptance. Embedded-mirror side pumping achieves this benefit without requiring HR coating of the notch, which vastly simplifies the approach. In particular, fabrication, modification, and repair of the system are all made significantly more practical by decoupling production of the mirror from cutting of the notch.

The fiber does not need to be stripped and recoated. Stripping the fiber reduces its mechanical strength, increasing the likelihood of breakage. In addition, for V-groove side pumping, the adhesive used to bond the stripped fiber to the substrate must additionally provide a high NA for the inner cladding (to guide the pump light); in practice, the NA of the stripped and recoated portion of the fiber is usually less than that of the unstripped fiber, leading to loss of pump light. In the present approach, only a short length of the fiber is stripped on one side (to allow the pump diode to be positioned close to the mirror), and the notch can be cut through any of the jacket and outer cladding that remains on the sides of the fiber; no recoating is required, and the adhesive used to attach the fiber to the substrate adheres to the fiber jacket (i.e., there are no restrictions on the refractive index or optical properties of the adhesive).

Embedded-mirror side pumping provides unidirectional pumping. The approaches to V-Docket groove side pumping shown in FIGS. 1b and 1d employ bidirectional pumping, which requires twice the fiber length to achieve the same pump absorption as unidirectional pumping. This extra fiber length is a disadvantage for many applications, including those that need to minimize nonlinear processes in the fiber (e.g., for high peak- or average-power systems or narrow-linewidth sources), minimize fiber consumption (of expensive specialty fibers), or operate at relatively blue wavelengths within the rare-earth gain curve (for $Er^{3+}$- or $Yb^{3+}$-doped fibers).

In an embodiment using a curved mirror, embedded-mirror side pumping allows the use of highly divergent pump diodes (as discussed above). V-groove side pumping does not possess this capability; although in principle a curved, optical-quality notch could be cut into the inner cladding, this approach is prohibitively difficult, and it is not evident in the manner that V-groove side pumping has been practiced or taught to date. Moreover, the main benefit of using a curved surface, improving coupling efficiency for highly divergent pump sources, cannot be realized with that technique because of the limited angular acceptance for total internal reflection.

In summary, the present invention ("embedded-mirror side pumping") introduces a new method for optically pumping DC fiber lasers and amplifiers using diode lasers, diode bars, or fiber-coupled diode sources. This approach addresses all of the above considerations and does not require compromises or trade-offs among the desired characteristics of a pumping scheme. Specifically, a mirror is embedded within the inner cladding of a DC optical fiber; the pump source is brought into close proximity to the mirror, without intervening optical elements, and the pump light is launched into the inner cladding with high efficiency.

This invention solves the long-standing problem of finding a low-cost and practical methodology for side-pumping of rare-earth-doped fiber amplifiers/lasers with commercially available diode lasers. The invention is useful in a wide variety of applications, including IRCM (Infrared countermeasures), trace gas detection, biological warfare agent detection, LIDAR/LADAR, materials processing, free space communication (e.g. secure communications between two satellites), and in medical applications such as tissue welding and ablation.

Additional features and advantages of the present invention will be set forth in, or be apparent from, the detailed description of preferred embodiments which follows.

DETAILED DESCRIPTION

Figure 1A:
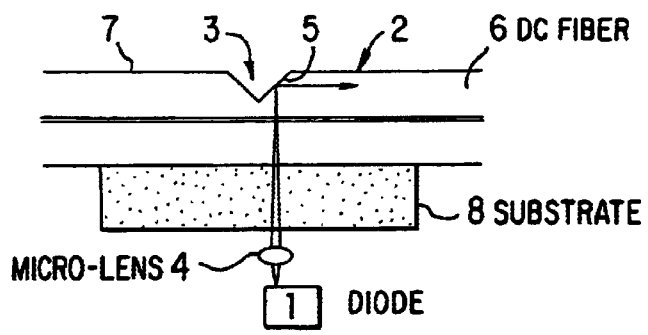
FIGS. 1a–d are schematic views of a prior art V-groove side pumping and variations: (a) is a standard configuration; (b)–(d) are other, alternative embodiments.
Figure 1B:
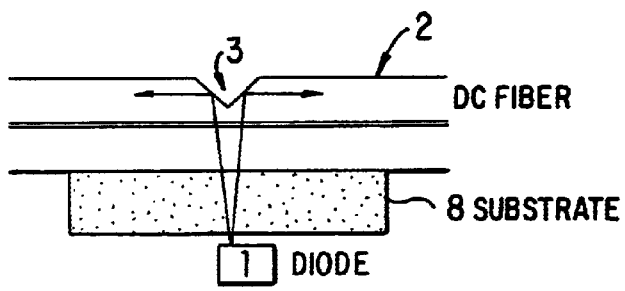
Figure 1C:
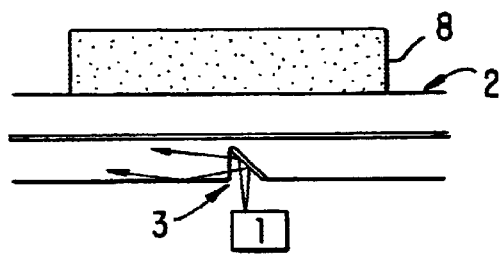
Figure 1D:
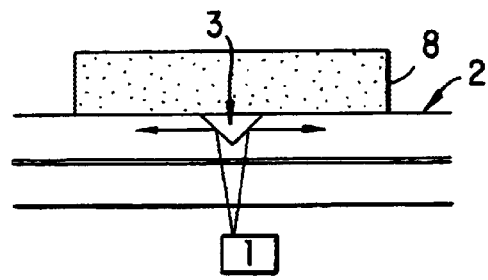

Definitions: The term "inner cladding" as used herein when referring to a double-clad fiber is in accordance with its common usage in the field of fiber optics; it is synonymous with the term "outer core" when used to refer to the same element of structure, e.g. as in U.S. Pat. No. 5,854,865. The term "mirror" as used herein includes reflecting devices or reflectors, capable of functioning in the manner described below wherein pump light impinging on the side of the optical fiber is redirected along the axis of the optical fiber, that are not initially a structure integral with the notch or merely a reflective coating applied to some portion of the notch surface, but that are separately fabricated from the optical fiber itself and then introduced into the notch.

Referring now to FIGS. 2–4b, fiber optic side-pumping system 10 includes a double-clad optical fiber 12 having a core 14, an inner cladding 16 disposed about core 14, and an outer cladding 18 disposed about inner cladding 16. A section of outer cladding 18 is removed to introduce a notch 20 into inner cladding 16 for receiving a mirror 22 as shown. Mirror 22 preferably is in cross-section a three-sided piece of glass that has been HR coated on a first face 24. HR face 24 is shown as curved in FIG. 2 and as straight (i.e., planar) in FIG. 4a, illustrating different embodiments as will be further explained below.

An adhesive (e.g., optical cement) is used to hold mirror 16 in place by face 26 against sidewall 25 of notch 20 and to serve as an index-matching compound between face 26 and fiber 12. A pump light 27 is launched through a second face 28 of mirror 16 by a pump diode 30, and face 28 has preferably been AR coated. After reflecting off face 24, pump light 27 exits mirror 22 through face 26; face 26 does not need to be coated because of the index-matching compound, but an appropriately designed AR-coating would not interfere with the performance. Because there are no intervening optics or other hardware required between pump diode 30 and face 28, pump diode 30 can be brought in close proximity to face 28, resulting in very little loss of brightness before pump light 27 enters fiber 12. Moreover, the sensitivity of the coupling efficiency to misalignment is relatively low (as discussed above in the context of lens-less V-groove side pumping).

Figure 5:
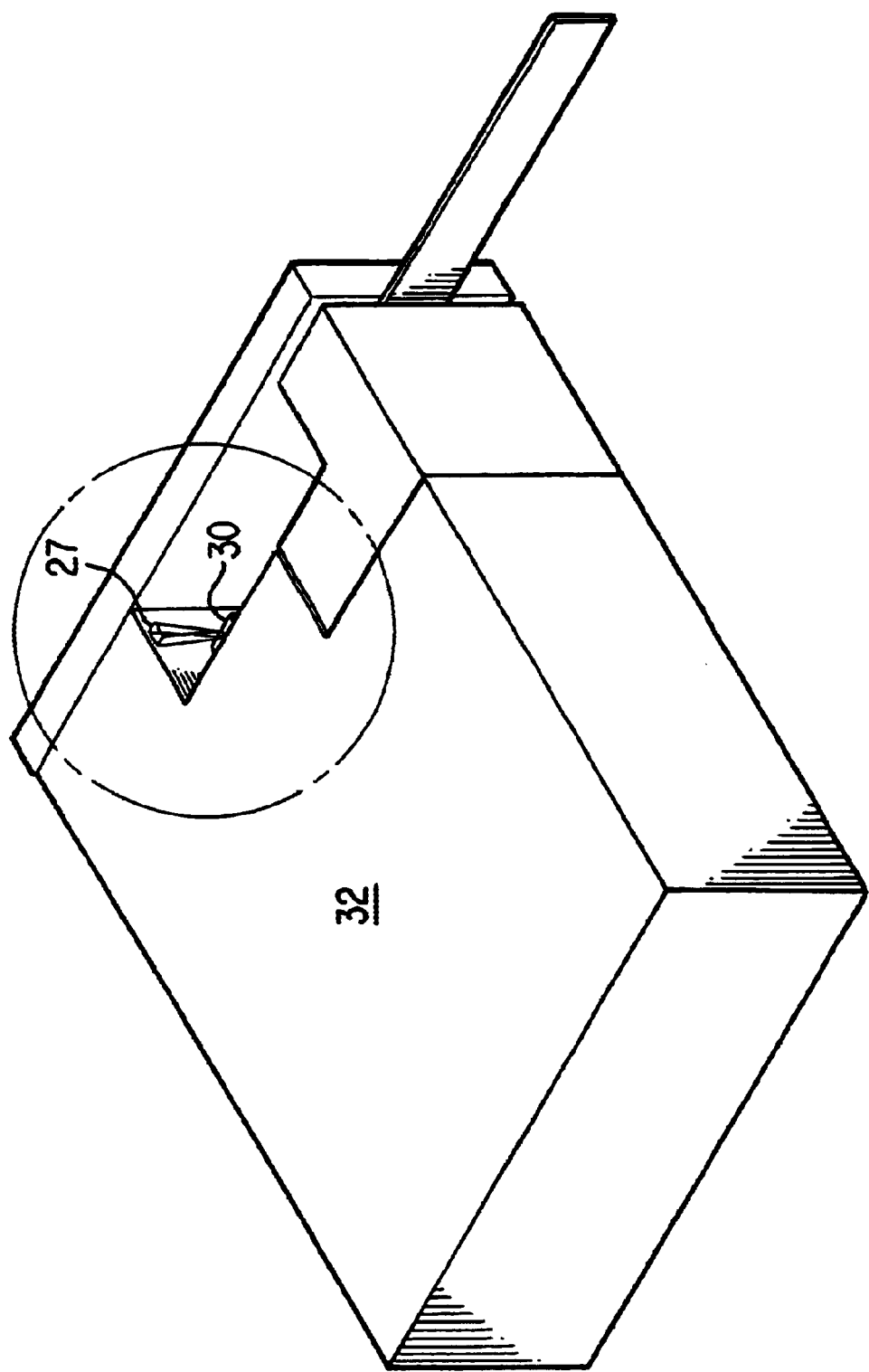
FIG. 5 is a three-dimensional scale drawing of a commercially available pump diode. The beam emerging from the laser is indicated by the dark lines.
Figure 6:
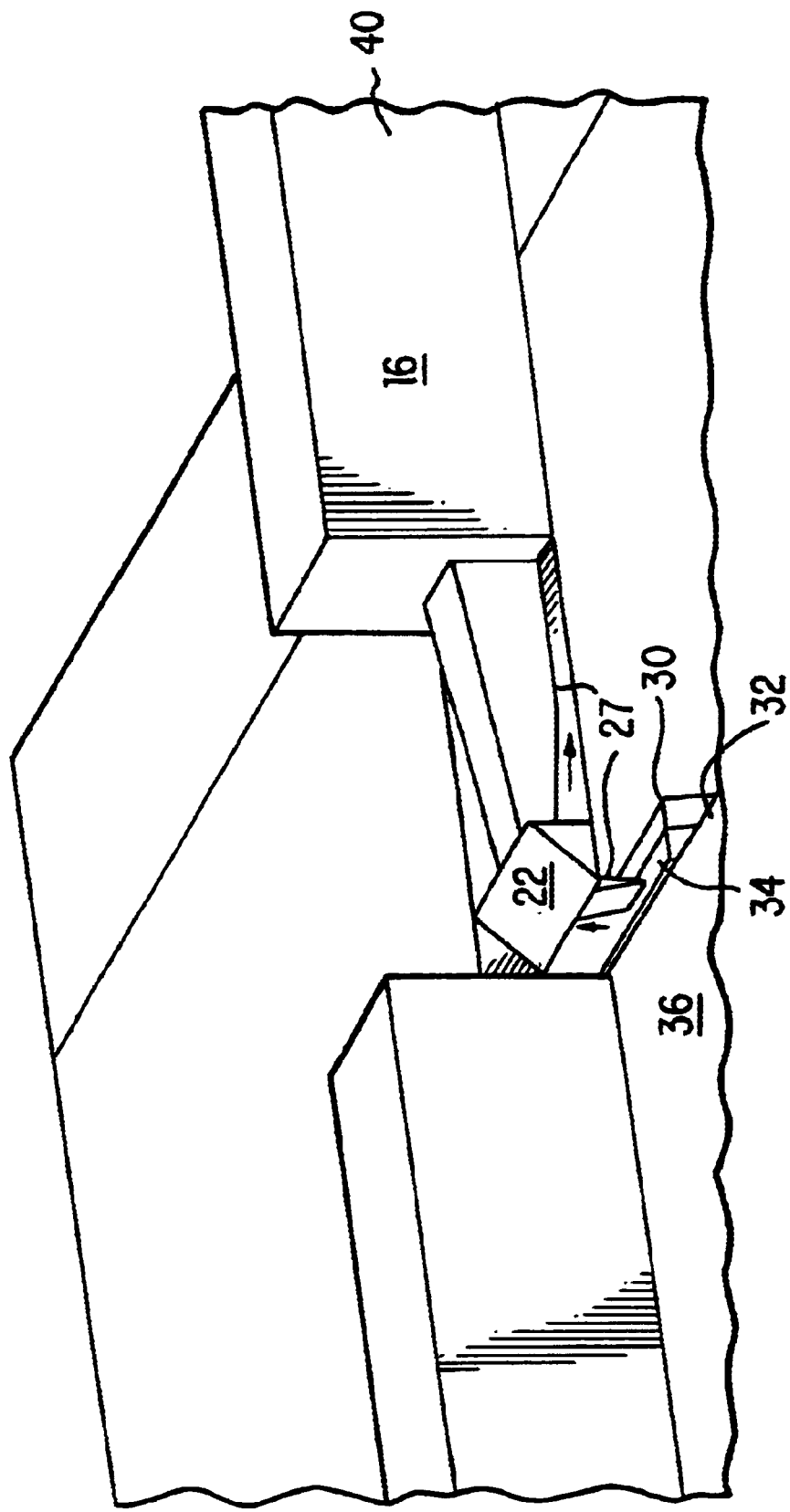
FIG. 6 is another perspective view of the circled part of FIG. 5, showing further details that include the pump beam reflected into the fiber inner cladding by an embedded side-mirror.

A more detailed illustration of the technique is provided by considering specific pump lasers and DC fibers. FIGS. 5 and 6 show a typical pump diode 30, positioned near a mirror 22 embedded (shown in FIG. 6) in an inner cladding 16 of fiber 12 (only partially shown), mounted on a heat sink 32. As illustrated, diode 30 is typically much smaller than heat sink 32, and includes a diode output facet 34 flush with an adjacent surface 36 of heat sink 32. FIGS. 5 and 6 show the size and divergence of pump light 27 emerging from diode 30, with the direction indicated by the arrows. In one embodiment, diode 30 is a broad-stripe laser with a 100-μm-wide output facet 34 and beam divergences of 12° and 28° in and perpendicular to the junction plane (i.e., a plane perpendicular to the fast axis shown in FIG. 11), respectively, such as the SDL-6380-A, a recently introduced 4-W pump source manufactured by SDL, Inc.

FIG. 6 shows a close-up view of pump light 27 being coupled into a DC fiber 12 using embedded-mirror side pumping. Inner cladding 16 of fiber 12 has a square cross-sectional dimension, 125 μm×125 μm. The length of mirror 22 is shown as 125 μm; in practice, mirror 22 could be longer than 125 μm. Pump light 27 is reflected by mirror 22 and thereby directed along a fiber longitudinal axis 40. The simplicity and compactness of the method are evident from the figure.

Figure 7:
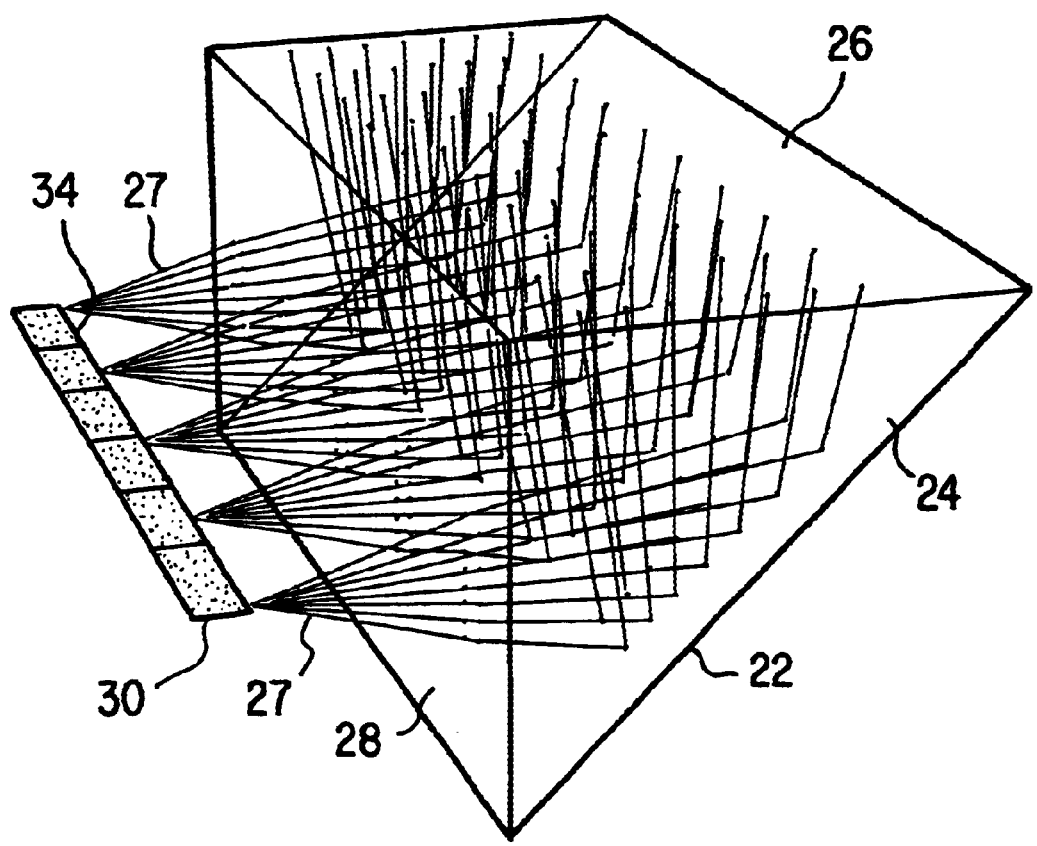
FIG. 7 is a ray-tracing diagram of the arrangement shown in FIGS. 5 and 6 showing the paths of rays emerging from the pump diode, traversing the mirror, and entering the DC fiber (not shown) at the output face of the mirror (where the rays are terminated for clarity).

The technique is further illustrated in FIG. 7 by a ray-tracing diagram showing the paths of rays emerging from diode 30 and entering DC fiber 12 for the representative pump diode 30 shown in FIGS. 5 and 6. The length of mirror 22 is again shown as 125 μm to match the fiber inner cladding. For clarity, FIG. 7 includes only the rays emerging from pump diode 30 and traversing mirror 22; fiber 12 has been omitted, and the rays terminate at exit face 26 of mirror 22 (where they enter the inner cladding of the fiber). Pump diode 30 is represented by groups of rays emerging from various points along diode facet 34. Each group of rays has the appropriate angular spread both perpendicular and parallel to the junction plane, and five such groups are shown (evenly spaced along the 100-μm length of the junction). In reality, pump light 27 emerges from every point along facet 34, but the five ray sources shown are sufficient to represent and visualize the propagation of pump light 27. Pump diode 30 is typically positioned less than 20 μm from coupling embedded mirror 22. This distance is representative; in practice, the pump source can be brought closer to mirror 22 (e.g., if necessary to reduce the loss of brightness). In the embodiment shown, embedded mirror 22 is a right-angle trihedral mirror, AR coated on input face 28 and HR coated on hypotenuse face 24; mirror 22 is preferably fabricated from BK-7 glass (see below). Face 24 is rectangular, with dimensions of 125 μm (equal to the inner-cladding diameter)×75 μm, with a preferred corresponding depth of notch 20 (see FIGS. 4 and 6) of about 53 μm (75 μm/√2), to minimize the interaction between notch 20 and light propagating in core 14. Upon exiting mirror 22, pump light 27 would enter inner cladding 16 of DC fiber 12 (not illustrated). Embedded mirror 22 easily accommodates all of pump light 27 (i.e., the coupling efficiency is high). This result is obtained despite the fact that the width of inner cladding 16 and mirror 22 (e.g., 125 μm) is only slightly larger than that of diode facet 34 (e.g., 100 μm).

The embodiment shown in FIGS. 4, 6, and 7 is representative. Several other implementations are possible and may offer advantages for certain applications. Embodiments that are included within the scope of the invention also include the use of fibers with other cladding sizes and shapes: An inner-cladding 16 diameter of 125 μm was selected for the above example because this size is common, but it is smaller than many DC fibers. Because coupling into larger DC fibers is easier, this example provided a stringent test of the method.

The invention includes the use of pump diodes with other facet sizes and beam divergences: The diode shown in FIGS. 5–7 offers high power and high brightness, but the technique is compatible with other pump sources.

Various fiber-coupled pump sources are useful in the practice of the invention. Several high-power (>10 W), fiber-coupled pump sources are available, in which several diodes or the emitters of a diode bar are coupled into a multimode fiber. Embedded-mirror side pumping is compatible with the use of these sources, by positioning the pump delivery fiber in close proximity to mirror 22 (similar to the pump diode in FIGS. 4, 6, and 7). Optionally, the end of the pump delivery fiber could be radiused, thereby providing a "fiber lens" to reduce the divergence of pump light 27 emerging from fiber 12.

Multiple pump sources may also be used. When using two or more embedded mirrors 22, two or more pump sources or diodes 30 may be used. The mirrors 22 should be separated by a sufficient distance that most of the pump light 27 launched by one mirror 22 will be absorbed before encountering the adjacent mirror 22. A given pair of pump sources 22 could be launched in a copropagating or counter-propagating direction.

Figure 8:
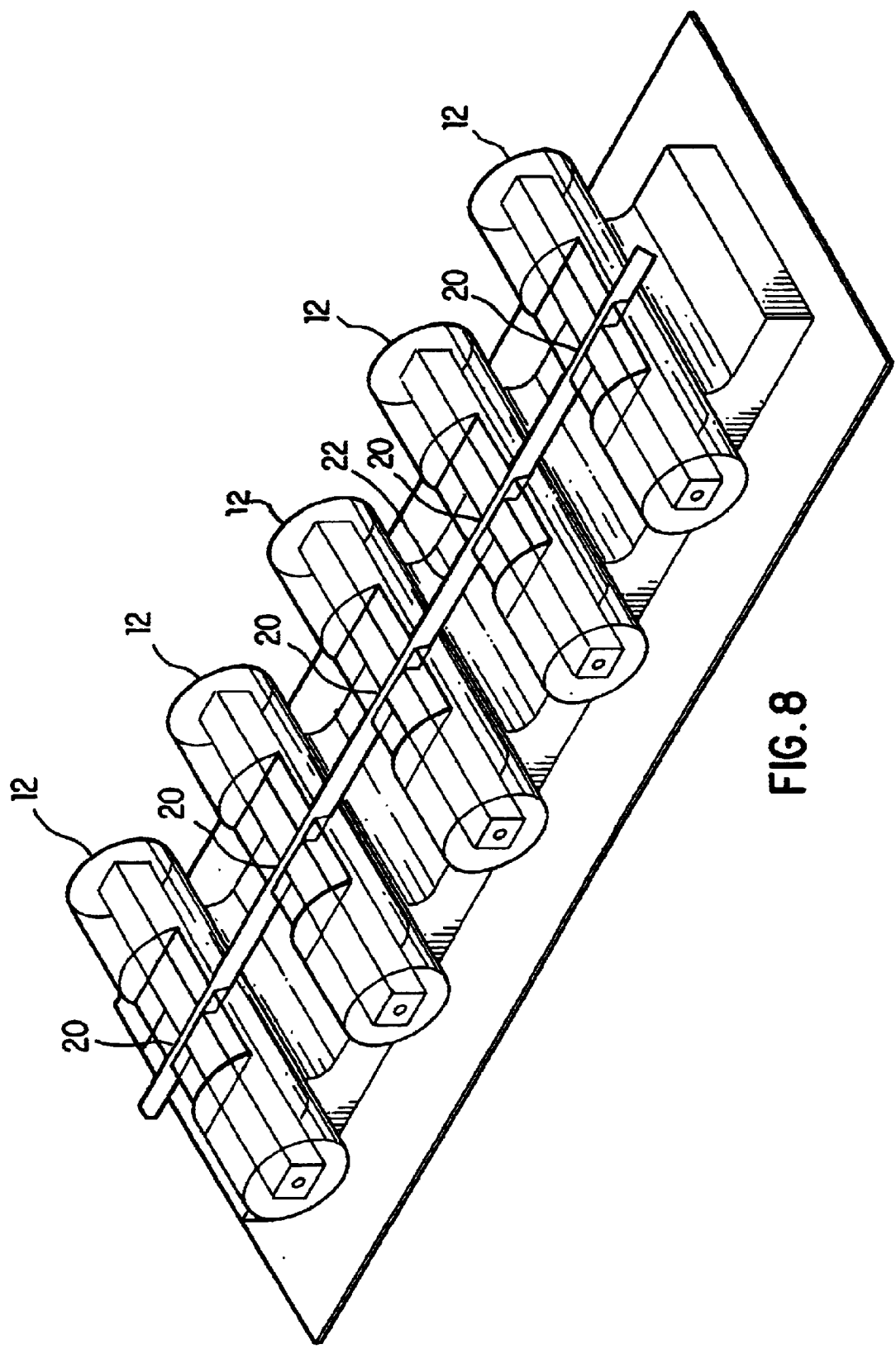
FIG. 8 is a three-dimensional scale drawing of an embodiment that allows coupling of the output of a diode bar using multiple embedded mirrors disposed on a single integral member.

In yet another embodiment, a diode bar, consisting of a linear array of emitters 30, can provide very high pump powers (40 W per bar is typical). By using one embedded mirror 22 for each emitter 30, the present invention provides a means to directly couple the emissions from the diode bar into one or more DC fibers. If one fiber is used, the mirrors should be separated by a sufficient length of fiber that most of the pump light launched by one mirror 22 will be absorbed before encountering an adjacent mirror 22 or before reaching either end of fiber 12. Alternatively, if mirrors 22 are embedded in separate fibers 12, this approach allows a single diode bar to pump multiple amplifiers. These two methods optionally could be combined, with one diode bar being used to pump multiple DC fibers at more than one position along each fiber 12. If the fiber or fibers 12 are appropriately coiled and aligned, during fabrication, all of the notches 20 can be cut simultaneously, and a single mirror 22 can be laid across the array of notches 20, as shown in FIG. 8. The relative insensitivity of embedded-mirror side pumping to the alignment of the pump source, diode 30, makes this approach practical, in contrast to approaches that require optical elements, e.g. lenses, to be interposed between the pump source and the DC fiber.

The invention includes embedded mirrors 22 having other shapes as well, e.g. having triangular, rhomboidal, or other cross-sections, to name but a few. While the embodiments illustrated in FIGS. 6–8 show a right-angle trihedral mirror with the hypotenuse HR coated and a 45° notch cut in the inner cladding of the fiber, other triangular shapes can be utilized provided the appropriately shaped notch 20 is fabricated to provide good surface-to-surface contact therewith. For example, a right-angle trihedral mirror 22 in which faces 24 and 26 are orthogonal, i.e. face 28 then being the hypotenuse, could have the hypotenuse face 28 AR coated and one of the other faces 24 or 26 HR coated; and pump light would be launched through the hypotenuse and would reflect from the HR-coated face. This geometry would require cutting a 90° V-shaped notch 20 in fiber 12 to accommodate mirror 22, with face 28 facing outward toward diode 30.

Figure 2:
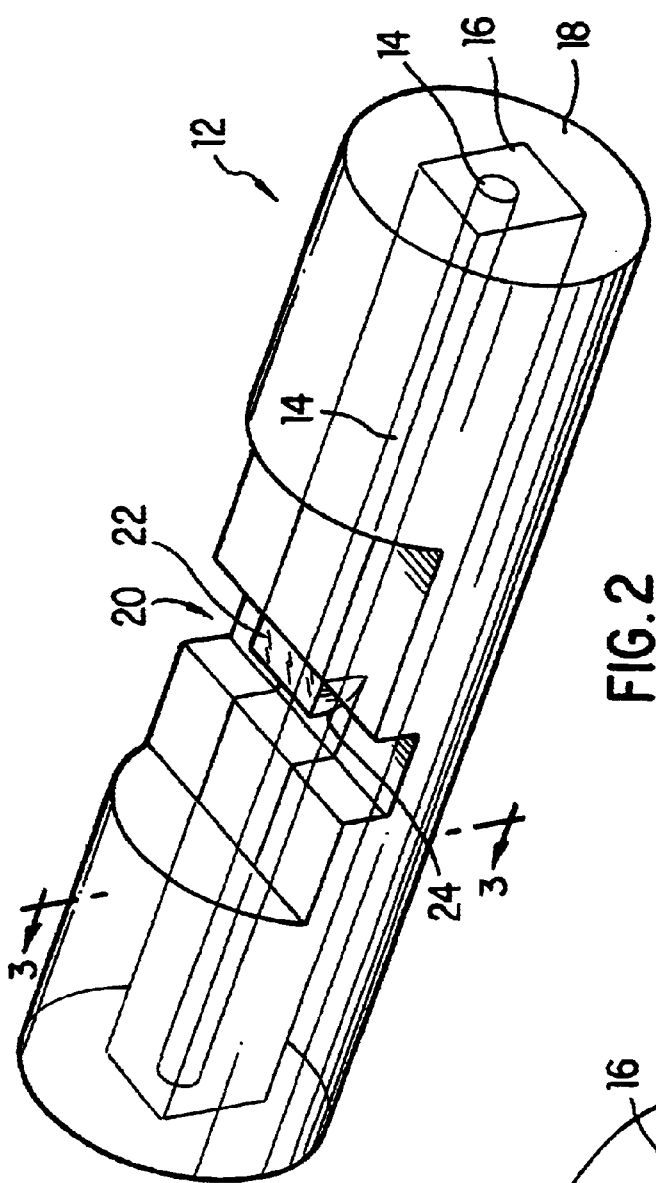
FIG. 2 is an elevational view of an optical fiber according to the invention.
Figure 3:
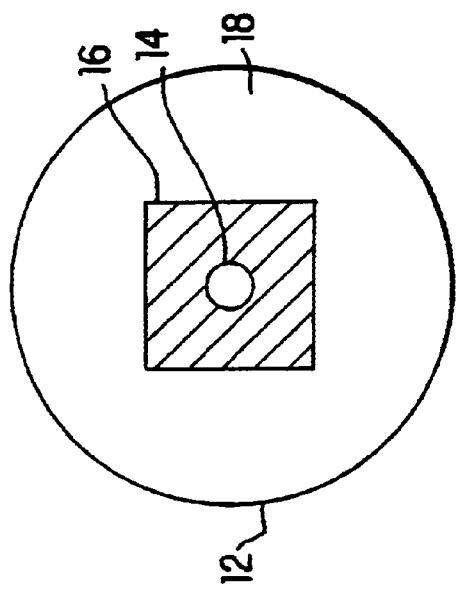
FIG. 3 is a cross sectional view taken through section 3—3 in FIG. 2.
Figure 4A:
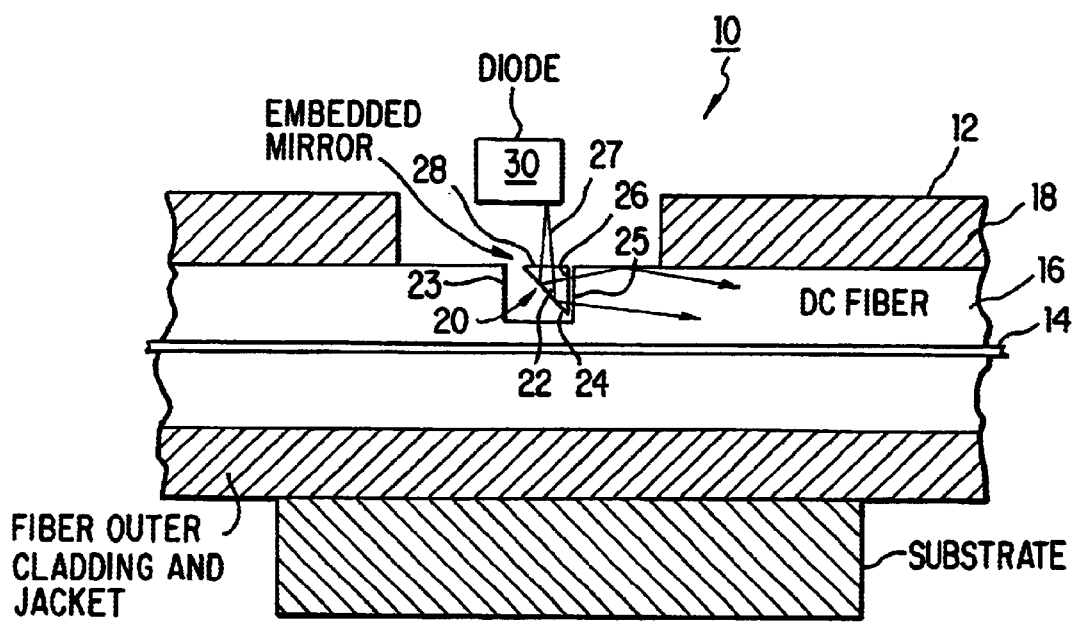
FIG. 4a is a schematic diagram of embedded-mirror side pumping.
Figure 4B:
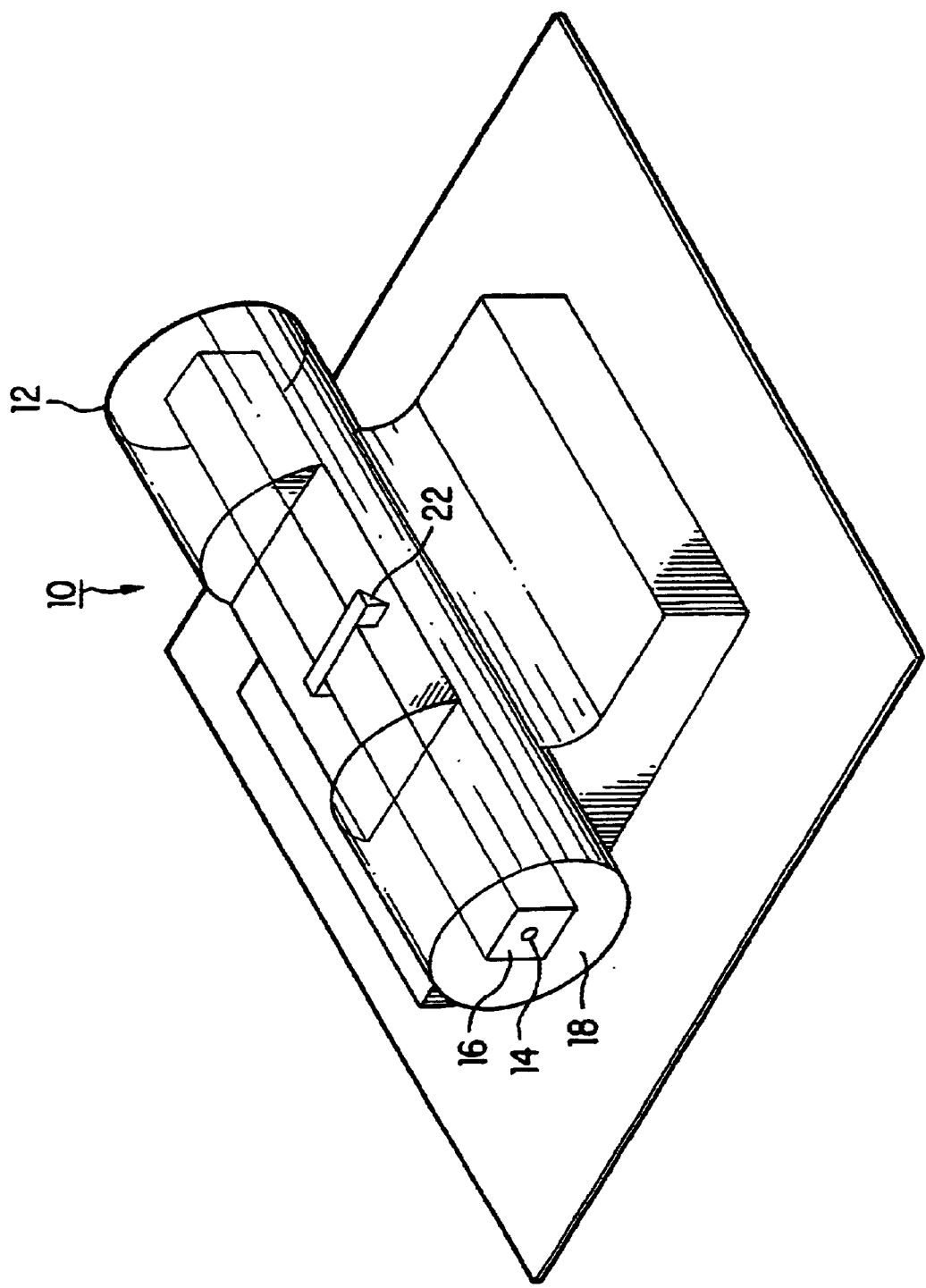
FIG. 4b is a three-dimensional scale drawing showing the fiber bonded to a substrate and the mirror embedded in the inner cladding (assumed to be square).
Figure 9A:
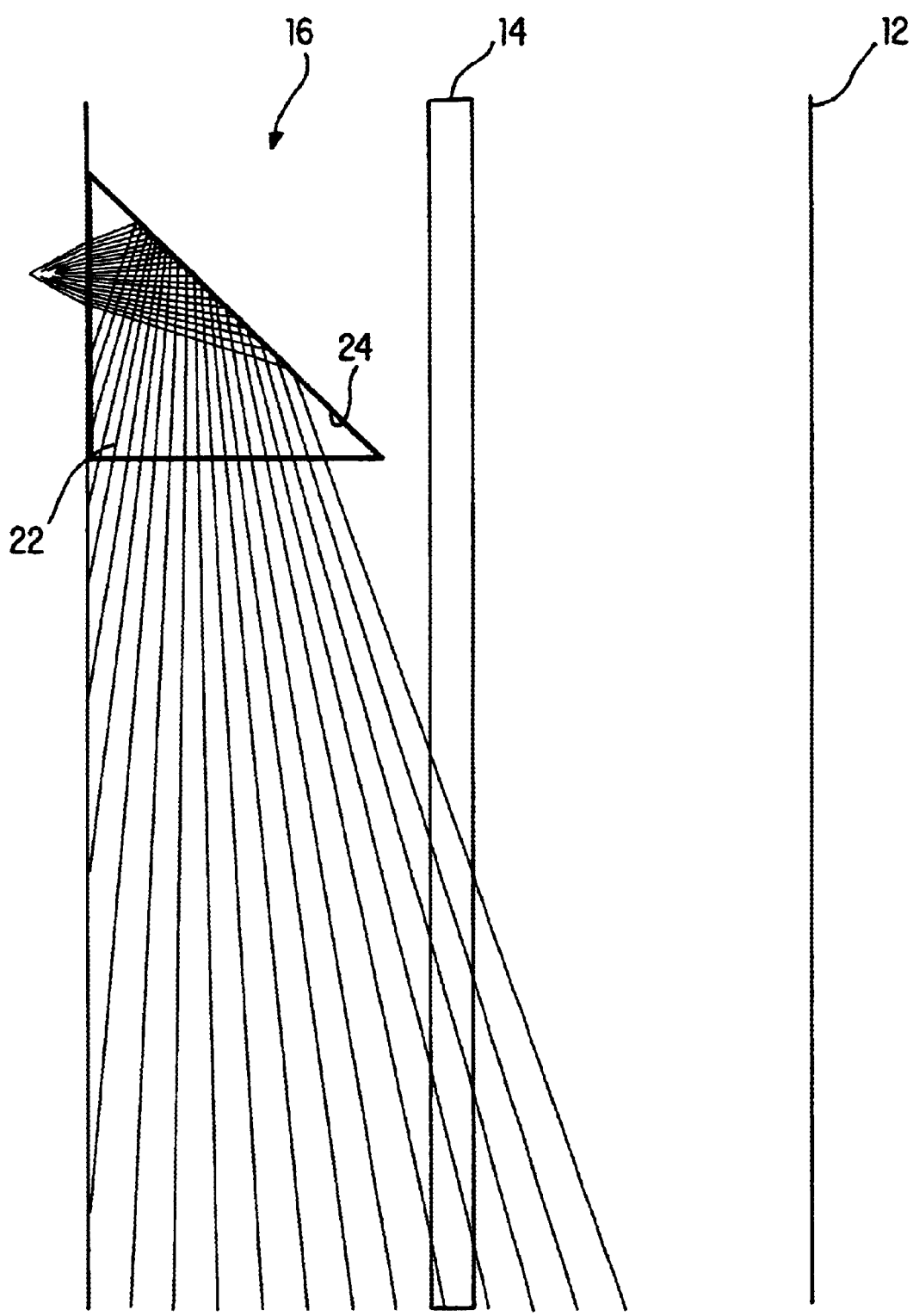
FIG. 9a as a ray trace (side view) showing a mirror whose HR face is not curved.
Figure 9B:
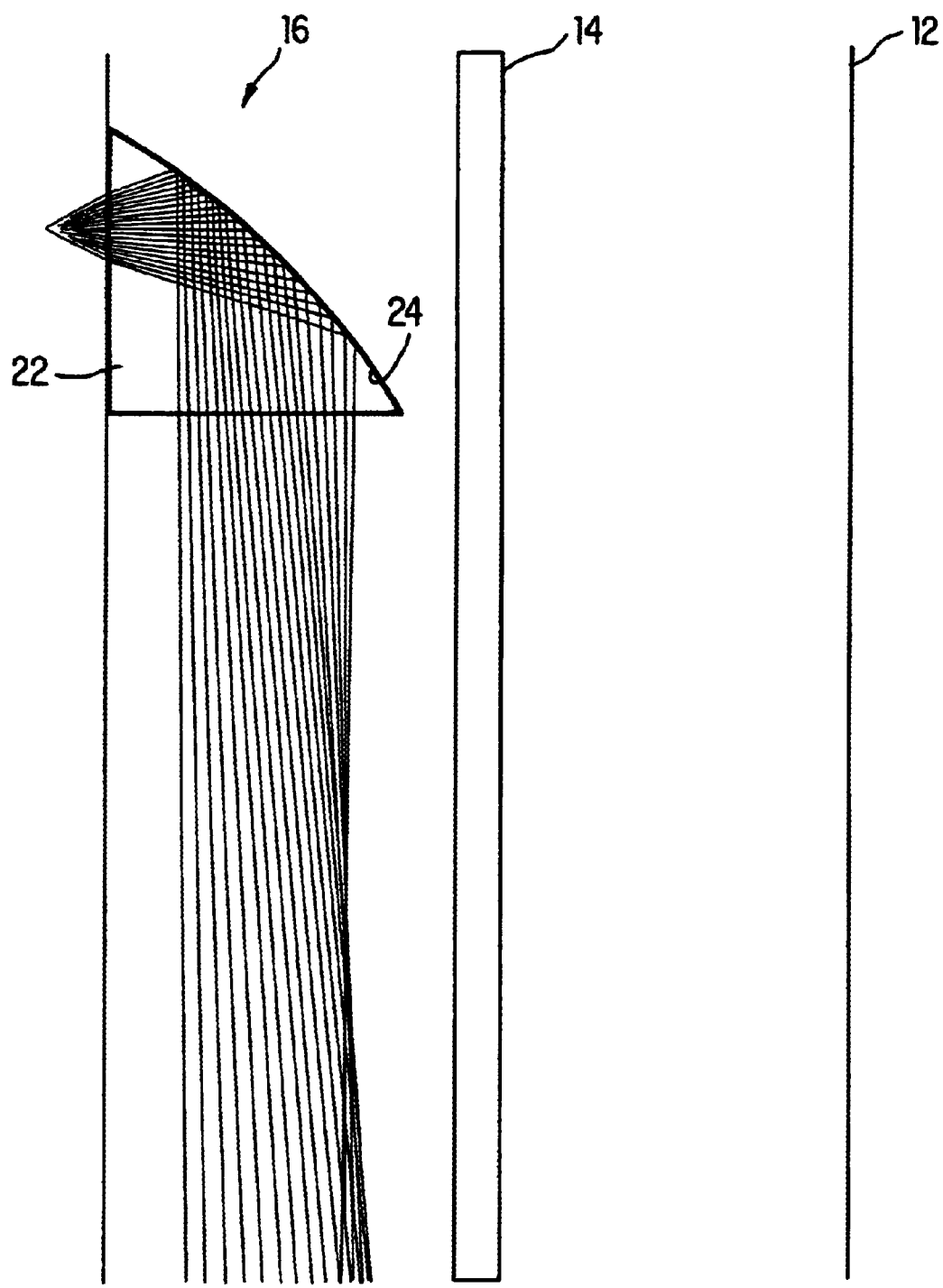
FIG. 9b is an alternative embodiment in which the mirror is curved to reduce the divergence of the pump beam. The divergence of the diode output perpendicular to the junction plane (fast axis) is 60° (NA=0.5), and the radius of curvature of the mirror is 130 μm.
Figure 9C:
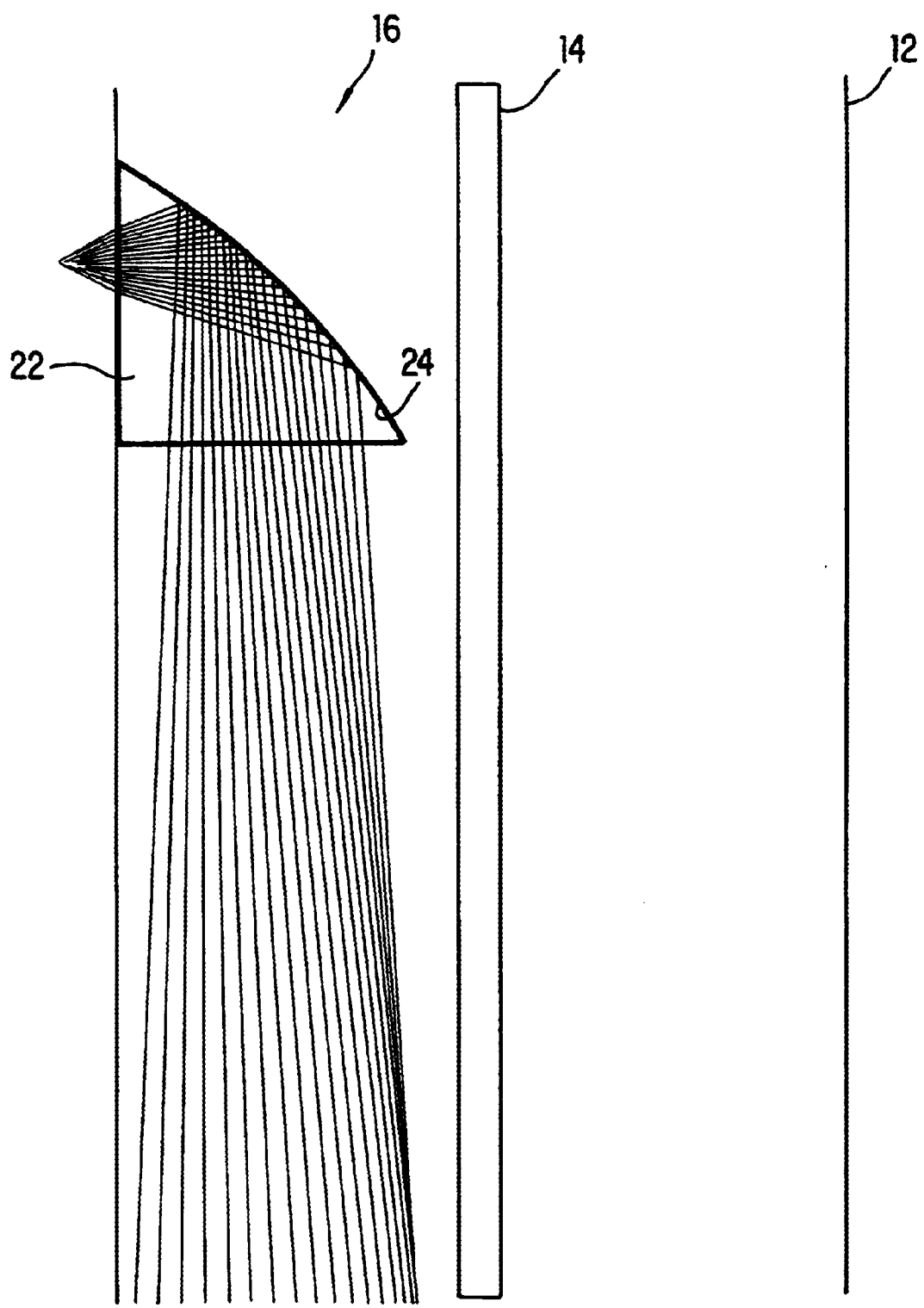
FIG. 9c is similar to 9b, but with a larger radius of curvature for the mirror (160 μm).
Figure 11:
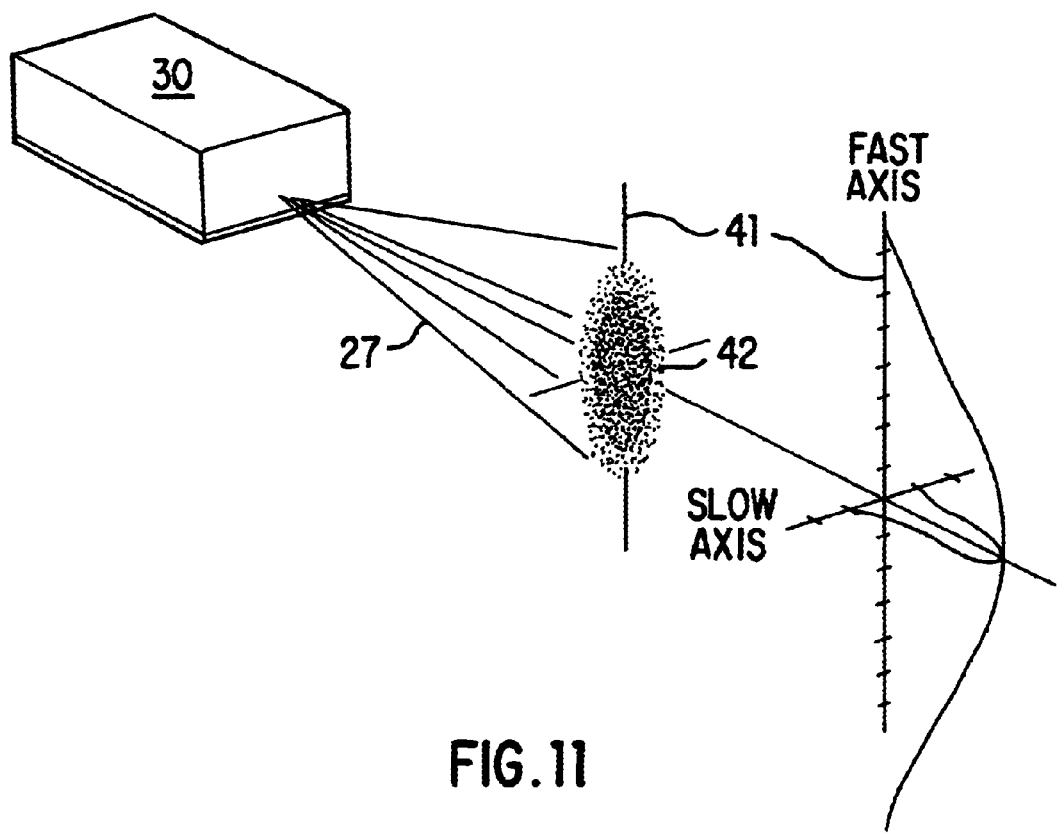
FIG. 11 is a schematic diagram showing an optical pump source light ray divergence pattern relative to its axes.

Another particularly preferred embodiment, shown in FIGS. 2, 9b, and 9c, employs a mirror 22 whose HR face 24 is curved, to reduce the divergence of pump light 27, as shown in the ray traces of FIGS. 9b and c. In FIGS. 9a–c, pump diode 30 has a divergence of 60° perpendicular to the junction plane (fast axis), corresponding to an NA of 0.5 (0.34 upon entering fused silica, the typical fiber material). FIG. 9a shows a ray trace for a mirror 22 whose HR face 24 is not curved, and it can be seen that the rays continue diverging upon reflection from surface 24. For comparison, as is evident in FIGS. 9b and 9c, the divergence of pump light 27 along a fast axis 41 (see FIG. 11) of diode 30 is substantially reduced—that is, light 27 is collimated along fast axis 41 of diode 30—by the curved mirror 22, allowing the use of highly divergent pump diodes 30 (including those with an NA higher than that of the inner cladding of the DC fiber) that are often low-cost and high power, while the technique also provides improved coupling efficiency. FIG. 11 shows diode 30 emitting light 27, with fast axis 41, which is defined by a plane 42 formed by diverging light rays that is perpendicular to the plane of the emitting region. The curved HR surfaces 24 in FIGS. 9b and 9c are illustrated as spherical, which is the simplest curve to fabricate (i.e., exotic, complex, or expensive grinding and polishing steps are not required). Moreover, the precise radius of curvature is not critical, as seen by comparing FIGS. 9b and 9c.

Figure 10A:
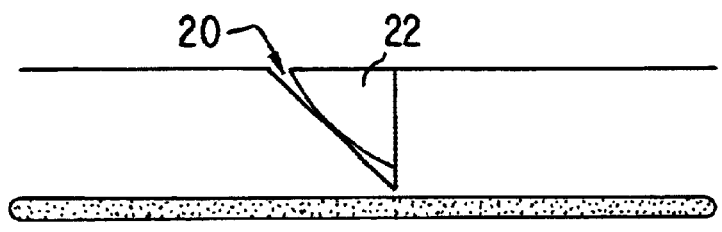
FIG. 10 is a schematic diagram showing the embodiment in which the HR face of the mirror is curved.
Figure 10B:
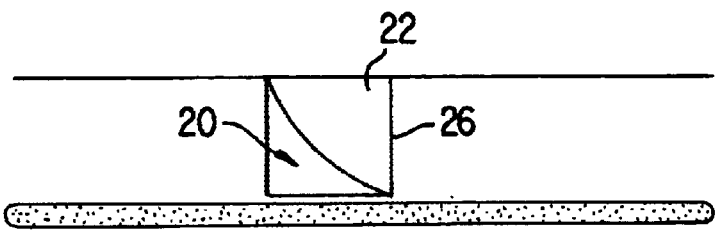
Figure 10C:
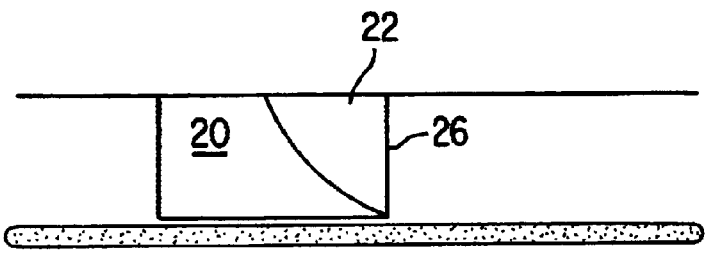

Notch 20 can have any shape as may be convenient for a particular application. Referring now to FIGS. 10a–c, notch 20 is shown as having either a square or rectangular configuration. These shapes have certain advantages and disadvantages, depending on the respective dimensions and conformity between notch 20 and mirror 22, and the characteristics of the double-clad fiber. In one configuration as shown in FIGS. 10b and c, the depth of notch 20 equals the length of face 26, facilitating the placement and fitting of mirror 22 into notch 20. When face 26 and a top face 28 are equal in length or otherwise conform to the dimensions of notch 20 depth and lengthwise, respectively, mirror 22 is then self-locating, facilitating fabrication and positioning of mirror 22 in notch 20. Notch 20 is preferably rectangular, or has a width greater than the length of face 28, to permit the size of the cutting tool used to fabricate notch 20 to be independent of the depth of notch 20, providing greater flexibility in working different size fibers 12 with just one cutting tool. This advantage is also realized when notch 20 is triangular and mirror 22 has a corresponding shape. When notch 20 is square, or has a width equal to the length of face 28, the size of the required cutting tool then depends on the depth of notch 20, limiting the use of the cutting tool for different size fiber 12.

Another significant advantage to notch 20 being square or rectangular is that HR face 24 is then spaced apart from opposing notch sidewall 23 to form an air gap therebetween. This maximizes the reflectivity, and the angular, spectral, and polarization acceptance, of face 24, as when face 24 is in contact with sidewall 23 as shown in FIG. 10a, this potentially degrades the reflectivity and angular acceptance of face 24. However, when rectangular or when the length-width dimensions of notch 20 otherwise do not correspond to those of mirror 22, mirror 22 is not entirely self-locating, requiring additional effort or attention in fabrication. Yet another advantage to notch 20 being square or rectangular is that for a given notch depth a larger mirror 22 can be accommodated as is apparent from FIGS. 10b and c. The larger mirror improves coupling efficiency and reduces alignment sensitivity of the mirror with respect to the pump source.

Fabrication of a mirror 22 can be accomplished in a manner similar to that used for conventional glass rods and fibers, i.e., by drawing a glass preform of the desired shape to the required size. The appropriate faces of the resultant rod are coated (HR and AR), and a short length is cleaved off of the rod to provide a mirror 22 for embedding in notch 20.

For the embodiments shown in FIGS. 6, 7, and 9a, the preform would consist of a triangular piece of glass (e.g., obtained by cutting a square rod along the diagonal to yield two triangular pieces). For the embodiment shown in FIGS. 2, 9b, and 9c, the preform would consist of a wedge-shaped sector of glass; such a preform could be obtained by dicing a round glass rod (which is readily available in a variety of sizes and materials).

This approach allows a very large number of mirrors (thousands) to be fabricated simultaneously, without requiring a new drawing or coating run for each amplifier. Moreover, by tapering the rod during the drawing process, mirrors of various sizes (appropriate for DC fibers of various inner-cladding diameters) can be fabricated simultaneously; in a given drawing run, a large range of sizes can thus be fabricated (e.g., the diameter can be systematically varied by a factor of 10 over the course of the run). The performance of the mirror (HR reflectivity, net transmittance, angular acceptance, optical bandwidth) can be measured prior to its incorporation into a DC fiber. Thus, embedded-mirror side pumping is very practical to implement.

The invention can be employed in an infrared countermeasures system, for the purpose of disabling infrared sensors on an incoming missile or warhead, by aiming a relatively high powered infrared laser beam toward the missile, overloading the sensors and thereby eliminating their target-locating capabilities.

Obviously many modifications and variations of the present invention are possible in light of the above teachings. It is therefore to be understood that the scope of the invention should be determined by referring to the following appended claims.

I claim:

1. An optical fiber, comprising:
    a core doped with a preselected gain material;
    an inner cladding disposed about said core;
    an outer cladding disposed about said inner cladding, said outer cladding having a section removed to expose a portion of said inner cladding;
    a notch disposed in said exposed portion of said inner cladding; and
    a mirror disposed within said notch so as to reflect light launched from an outside source into said fiber, wherein said mirror is separately fabricated from the optical fiber, introduced into the notch, and attached therein.

2. A fiber as in claim 1, wherein said mirror has a light-reflecting face for reflecting light into said inner cladding, said notch includes a surface adjacent said light-reflecting face, and said adjacent surface and said light-reflecting face are spaced apart in order to prevent a loss of reflectivity and angular acceptance of said light-reflecting face.

3. A fiber as in claim 2, wherein said light-reflecting face is curved so that light reflected therefrom is collimated with respect to a fast axis of said diode.

4. A fiber as in claim 1, wherein said mirror comprises a first face disposed so as to first receive light from an outside light source, a second face disposed at about a 90 degree angle to an outer surface of said inner cladding, and a third face intersecting said first face at an angle of about 45 degrees.

5. A fiber as in claim 4, wherein said third face further comprises a high reflectivity surface.

6. A fiber as in claim 5, wherein said high reflectivity surface is curved so that light reflected therefrom is collimated with respect to a fast axis of said outside source.

7. A fiber as in claim 1, wherein said minor comprises a right angle trihedron having three primary longitudinally extending faces including:
    a first face disposed so as to first receive light from an outside light source;
    a second face having a high reflectivity coating disposed thereon for reflecting said light after said light passes through said first face; and
    a third, light-exiting face.

8. A fiber as in claim 1, wherein said fiber includes a plurality of said notches each having a said mirror disposed therein, and wherein adjacent notches are sufficiently spaced apart to allow light launched into a mirror and reflected therefrom into said fiber to be substantially absorbed in said fiber before encountering an adjacent mirror or an end of said fiber.

9. A fiber as in claim 1, wherein said fiber is included in a plurality of said fibers that are aligned so as to allow one said minor to extend across said plurality of fibers and be disposed in a notch in each of said fibers of said plurality of said fibers.

10. An optical fiber system for transmitting and amplifying light, comprising:

an optical fiber having:
a core doped with a preselected gain material;
an inner cladding disposed about said core;
an outer cladding disposed about said inner cladding, said outer cladding having a section removed to expose a portion of said inner cladding;
a notch disposed in said exposed portion of said inner cladding; and
a mirror disposed within said notch, wherein said mirror is separately fabricated from the optical fiber, introduced into the notch, and attached therein; and
a diode for generating a light directed at said mirror, whereby said mirror reflects said light along the axis of said fiber.

11. An optical fiber system as in claim 10, wherein said mirror has a light-reflecting face for reflecting light into said inner cladding, said notch includes a surface adjacent to said light-reflecting face, and said adjacent surface and said light-reflecting face are spaced apart in order to prevent a loss of reflectivity and angular acceptance of said light-reflecting face.

12. An optical fiber system as in claim 11, wherein said light-reflecting face is curved so that light reflected therefrom is collimated with respect to a fast axis of said diode.

13. An optical fiber system as in claim 10, wherein said mirror comprises a first face disposed so as to first receive light from an outside light source, a second face disposed at about a 90 degree angle to an outer surface of said inner cladding, and a third face intersecting said first face at an angle of about 45 degrees.

14. An optical fiber system as in claim 13, wherein said third face further comprises a high reflectivity surface.

15. An optical fiber system as in claim 14, wherein said high reflectivity surface is curved so that light reflected therefrom is collimated with respect to a fast axis of said diode.

16. An optical fiber system as in claim 10, wherein said mirror comprises a right angle trihedron having three primary longitudinally-extending faces including:
a first face disposed so as to first receive light from an outside light source;
a second face having a high reflectivity coating disposed thereon for reflecting said light after said light passes through said first face; and
a third, light-exiting face.

17. An optical fiber system as in claim 10, wherein said fiber includes a plurality of said notches each having a said minor disposed therein, and wherein adjacent notches are sufficiently spaced apart to allow light launched into a mirror and reflected therefrom into said fiber to be substantially absorbed in said fiber before encountering an adjacent minor or an end of said fiber.

18. An optical fiber system as in claim 10, wherein said fiber is included in a plurality of said fibers that are aligned so as to allow one said mirror to extend across said plurality of fibers and be disposed in a notch in each of said fibers of said plurality of said fibers.

19. An optical fiber system as in 10, wherein the system is used to effectuate infrared countermeasures against an incoming missile.

20. A method for launching light into an optical fiber having an axis, comprising the steps of:
providing an optical fiber, said optical fiber comprising:
a core doped with a preselected gain material;
an inner cladding disposed about said core; and
an outer cladding disposed about said inner cladding, said outer cladding having a section removed to expose a portion of said inner cladding;
introducing a notch in said exposed portion of said inner cladding;
disposing a minor within said notch, wherein said mirror is separately fabricated from the optical fiber, introduced into the notch, and attached therein; and
launching a light toward said mirror, whereby said mirror reflects said light into said inner cladding and said light is thereby transmitted along the fiber axis.

21. A method as in claim 20, wherein said mirror has a light-reflecting face for reflecting light into said inner cladding, said notch includes a surface adjacent to said light-reflecting face, and said adjacent surface and said light-reflecting face are spaced apart in order to prevent a loss of reflectivity and angular acceptance of said light-reflecting face.

22. A method as in claim 21, wherein said light-reflecting face is curved so that light reflected therefrom is collimated with respect to a fast axis of said diode.

23. A method as in claim 20, wherein said mirror comprises a first face disposed so as to first receive light from an outside light source, a second face disposed at about a 90 degree angle to an outer surface of said inner cladding, and a third face intersecting said first face at an angle of about 45 degrees.

24. A method as in claim 23, wherein said third face further comprises a high reflectivity surface.

25. A method as in claim 24, wherein said high reflectivity surface is curved so that light reflected therefrom is collimated with respect to a fast axis of said diode.

26. A method as in claim 20, wherein said mirror comprises a right angle trihedron having three primary longitudinally-extending faces including:
a first face disposed so as to first receive light from an outside light source;
a second face having a high reflectivity coating disposed thereon for reflecting said light after said light passes through said first face; and
a third, light-exiting face.

27. A method as in claim 20, wherein said fiber includes a plurality of said notches each having a said minor disposed therein, and wherein adjacent notches are sufficiently spaced apart to allow light launched into a minor and reflected therefrom into said fiber to be substantially absorbed in said fiber before encountering an adjacent mirror or an end of said fiber.

28. A method as in claim 20, wherein said fiber is included in a plurality of said fibers that are aligned so as to allow one said mirror to extend across said plurality of fibers and be disposed in a notch in each of said fibers of said plurality of said fibers.

* * * * *

UNITED STATES PATENT AND TRADEMARK OFFICE
CERTIFICATE OF CORRECTION

PATENT NO.    : 6,704,479 B2
DATED         : March 9, 2004
INVENTOR(S)   : Koplow, Jeffrey P.

It is certified that error appears in the above-identified patent and that said Letters Patent is hereby corrected as shown below:

Column 2,
Line 41, after "while a", replace "micro" with -- micro-lens --

Column 6,
Line 32, after "approaches to", replace "V-Docket groove" with -- V-groove --

Column 7,
Line 44, after "FIG. 9a", replace "as" with -- is --

Column 14,
Line 11, after "disposing a", replace "minor" with -- mirror --

Signed and Sealed this

First Day of June, 2004

JON W. DUDAS
*Acting Director of the United States Patent and Trademark Office*